Patented Dec. 2, 1930

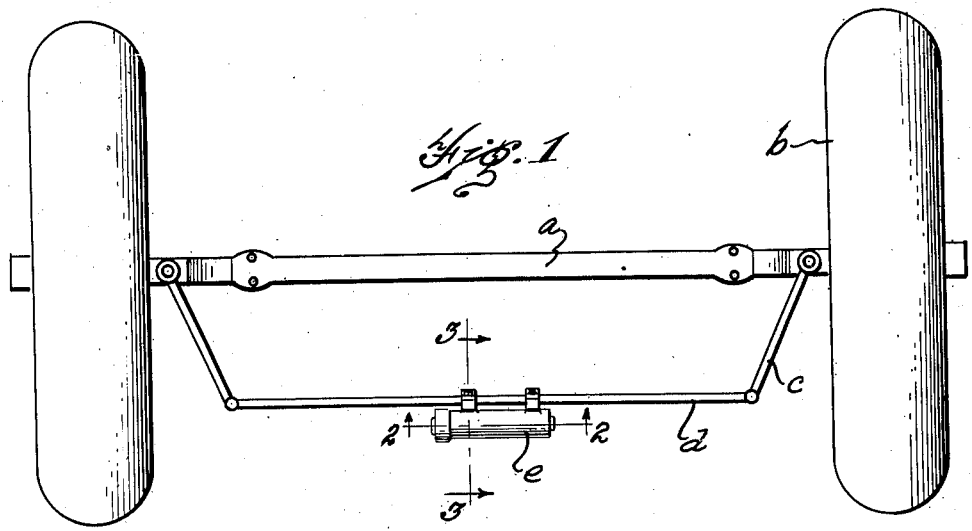
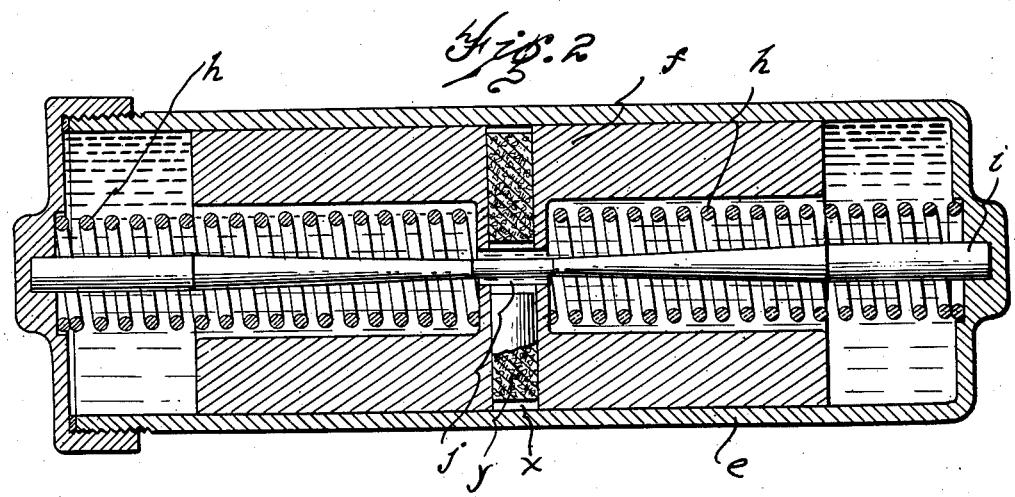
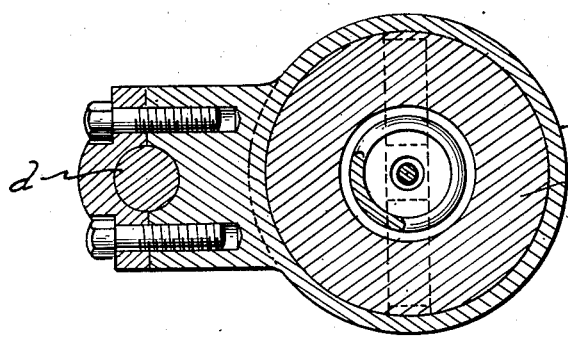

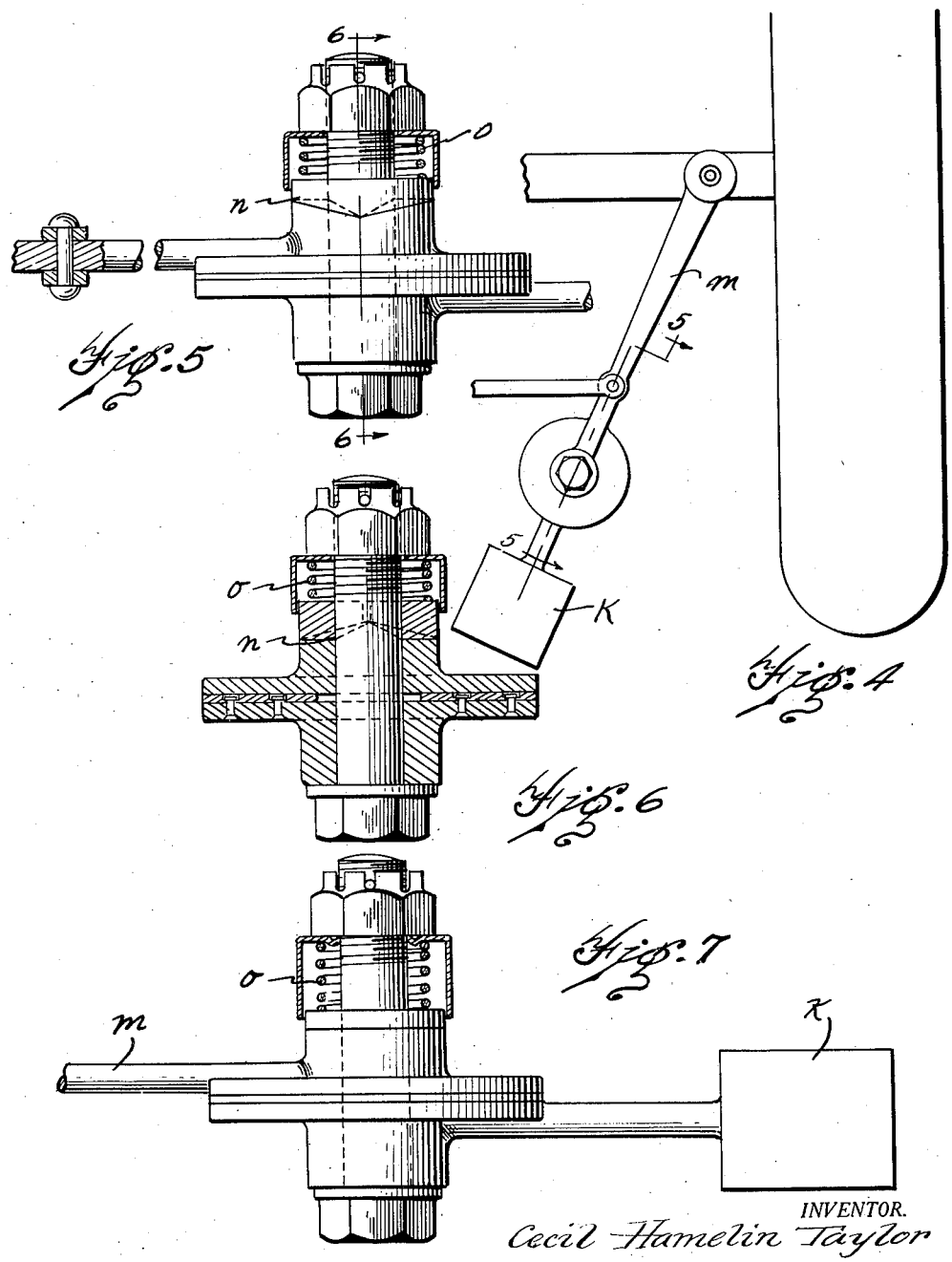

1,783,348

UNITED STATES PATENT OFFICE

CECIL HAMELIN TAYLOR, OF DETROIT, MICHIGAN

SHIMMYING DAMPENER

Application filed March 27, 1925. Serial No. 18,798.

This invention relates to steering apparatus. In the steering gear of automobiles there often occurs what is popularly known as "wheel shimmying". This is especially true with the introduction of the new balloon type of tires. This shimmying is a periodical lateral wobbling or shaking of the wheels due to some force that starts them to vibrate and further periodical impulses which tend to amplify these vibrations, resulting in a very pronounced shaking of the wheels which makes the steering difficult. This is a common difficulty at slow speeds with the old type of tire where some of the linkage in the steering mechanism has considerable lost motion due to wear or other reasons. This is known as slow speed shimmying. However, with the advent of the large balloon tire with the low pressures of inflation, a great deal of flexibility has been introduced into the tire and the result has been that the shimmying troubles had been very much augmented. This is especially true with shimmying at a high speed,—that is, when the car is travelling at, say 50 or 55 miles an hour. At such speeds wobbling or vibration of the wheels is extremely dangerous as it may result in deflection from the road.

These difficulties have been pretty generally recognized in engineering circles within the last year or two, and various efforts have been made to correct the difficulty, but so far as I am aware, these corrective measures have not been altogether successful. One of the measures of correction that had been undertaken is the employment of a hydraulic dashpot on one of the stationary members of the running gear with a piston directly connected to one of the movable members of the steering gear. This, of course, tends very materially to dampen the vibrations and more or less eliminate the trouble, but this introduces a very serious factor into the steering action of the car. It introduces a direct resistance to the steering action, which is very troublesome where a quick maneuvering of the steering mechanism is necessary.

It is the object of the present invention to introduce a dampening action that will more or less correct the shimmying action and which, on the contrary, will in no way interfere with the easy steering action of the car. This is accomplished, when broadly considered, by utilizing energy dissipation which is calculated to dissipate more energy than is the power in-put at each vibration, tending to amplify the vibration and build up the shimmying action. This energy dissipation is effected by movement between relatively movable parts, which, however, are not rigidly connected. This, therefore, avoids a direct positive resistance to the movement of the steering gear, such as is calculated to affect the freedom of the steering action. In short, by simply relying upon the disinclination of a mass to change its present state of rest or movement, a friction power dissipation is secured which more than counterbalances the power in-put in generating the shimmying action and thereby overcomes this difficulty. This frictional resistance does not need to be very large to overbalance the small power-input which is calculated to amplify each vibration in building up the shimmying action; hence this is no very material drag on the steering mechanism. This is especially true as the dissipation of energy is only marked where the movement is sudden, as with the periodic vibrations due to the shimmying action. But on the other hand, the steering movement, no matter how quickly performed, does not have such suddenness as is calculated to generate any material friction due to the inertia of the dampening member.

While the invention is intended primarily for a steering gear of automobiles, it will be obvious that it has a much wider application, as it can be used on the controls of an aeroplane, steering gear of a boat or torpedo, and almost anywhere where any control or steering mechanism may be subjected to undesirable vibrations.

Referring to the drawings:

Fig. 1 is a plan view of the front portion of the running gear of an automobile, showing the dampening device applied.

Fig. 2 is a longitudinal section on the line 2—2 of Fig. 1.

Fig. 3 is a cross section on the line 3—3 of Fig. 1.

Fig. 4 is a fragmentary plan view of a different type of dampening device applied to the running gear, but employing the same principle of operation.

Fig. 5 is a section taken on the line 5—5 of Fig. 4.

Fig. 6 is a section on the line 6—6 of Fig. 5.

Fig. 7 is a side elevation, partly in section, of a still different modification.

$a$ designates the front axle; $b$ the tires; $c$ the steering lever arms, and $d$ the connecting rod. There is shown mounted by clamps on the connecting rod, the dashpot cylinder $e$, which is part of the dampening device. However, it might be mounted almost anywhere on the moving parts of the steering gear, and I therefore do not want it understood that it has to be mounted on the connecting rod. This dashpot is provided with a relatively heavy piston for the size of the dashpot— say about eight pounds; this is designated $f$. This piston is ordinarily centralized by the two coil springs $h$, and is provided with a center aperture $j$ through which preferably passes a metering pin $i$. This metering pin may be replaced by a different metering pin to change the size of the orifice through the piston. It will be understood, however, that this is merely a detail and the position of the orifice or the means for adjusting it may be changed within wide limits. It will be obvious that this relatively heavy piston has a tendency to resist any sudden attempt to change its then present state of rest or movement. This is what is known as inertia. Consequently when anything strikes the wheels of the car which tends to set up a periodic vibration, this is of course immediately communicated to the connecting rod, and positively communicated to the dashpot cylinder. However, the heavy piston having no positive connection with the cylinder, tends to remain in its state of rest or movement. This tendency to relative movement of the cylinder and the piston is of course resisted by the liquid in the cylinder, which is thereby caused to flow through the dashpot opening, and the energy dissipated in the form of friction and heat as the fluid passes through the dashpot orifice in the familiar way.

Of course, it will be apparent that the dissipation of energy at any one vibration is not relatively great. It is, however, sufficient to counteract the power impulses put into each vibration after the vibrations are started, which is calculated to amplify the vibration and generate the shimmying action. It will be readily understood that on the other hand with steering movement of the steering gear that the action is comparatively slow as compared with the vibrations that start the shimmying, and hence the dampening device offers little or no resistance, but the piston and the cylinder simply move as a unit with the connecting rod.

This principle of operation can be worked out in numerous ways, two of which I have illustrated in Figs. 4 to 7 inclusive. In the form shown in Figs. 4 to 6 a weighted lever arm $k$ forms an extension of the steering arm $m$, but is connected therewith by means of a joint $n$ which comprises a pair of friction discs, held together by a compression spring $o$. However, the friction discs are one of them grooved and the other provided with a V-like projection or incline. The result is that there is a separating action between the projection and the groove when the two members of the joint engage in relative movement. This, of course, increases the pressure of the spring and thereby increases the frictional resistance and the dissipation of energy.

In the form shown in Fig. 7, this incline and groove arrangement is omitted. There is simply a pair of friction discs. These work all right in initially imposing frictional resistance, but as soon as the engagement is broken between the discs, the friction resistance immediately drops. With the incline and groove arrangement shown in Fig. 5, the incline is calculated to keep up and even increase the frictional loss after the discs of the joint first break the engagement.

With this lever type of device, it will be apparent that it operates on the inertia principle as the weight $k$ has sufficient inertia so that a sudden effort to change its present state of rest as by wheel vibrations is resisted by the lever sufficiently so that the members of the friction joint break engagement and in doing so of course a friction is generated which dissipates sufficient energy to overcome the power impulses tending to generate the shimmying action.

I prefer to use my inertia member upon a portion of the steering gear, but it is possible to secure measurably good results by having the inertia member mounted on some other part of the vehicle—on the body or axle, for instance. These members are subjected to vibrations when shimmying takes place, and consequently a dampener mounted on either of these members and properly designed will be calculated to measurably dampen the wheel shimmying action. When the inertia member is attached to the body it is possible to use much larger masses than is desirable on the steering gear.

The piston is provided with the drilled holes $x$, in which are inserted the yieldable inserts $y$. These inserts are preferably of cork which may be readily compressed due to the fact that it contains a large number of small air cells. The purpose of these inserts is to provide means for taking care of the thermal changes and variations in pressure.

The hydraulic inertia element, broadly considered, has a large field of use. It may be used not only to dampen vibrations or shimmying in connection with steering gears or control mechanism, but it may also be used as a vibration dampener in almost any connection where vibrations are objectionable.

What I claim is:

1. In steering gear or control mechanism, a movable control member, an inertia member in the form of a piston, a dashpot cylinder supporting the piston on the control member, the said piston being provided with an orifice from one side to the other, and a metering needle which is supported in the cylinder for regulating the cross section of the opening in the piston.

2. In an inertia device, the combination of a cylinder containing fluid, a piston moving in the cylinder and provided with a yieldable insert to take care of thermal changes and variations of the pressures, an opening being provided from one side of the piston to the other through which fluid can pass upon the movement of the piston.

3. An inertia member, comprising a cylinder, a free piston slidable therein, said cylinder and piston provided with a dashpot opening from one side of the piston to the other and the cylinder arranged to contain a fluid, and means for varying the area of the dashpot opening.

4. A vibration dampening construction comprising a movable controlled member, a free inertia member associated therewith, spring means for holding the free inertia member in normal position with respect to the controlled member so that the inertia member may move in opposite directions with respect to the controlled member, fluid means displaced by such movement and a dashpot construction having a fluid passage port variable in area upon such relative movement.

5. An inertia member comprising a cylinder, a piston within the cylinder and movable with respect thereto, said cylinder containing a controlling fluid some of which is displaced upon relative movement between the cylinder and piston and a dashpot construction including a port for the passage of displaced fluid which is variable in area as the piston and cylinder move relatively to each other.

6. In a control device for an operable mechanism comprising a cylinder, a piston within the cylinder and movable with respect thereto, said cylinder containing a liquid some of which is displaced upon relative movement between the piston and cylinder and means variable in volume and associated with the interior of the cylinder for compensating for thermal changes and variations of pressure within the cylinder.

7. A control device for operable mechanism comprising a cylinder containing a liquid, a piston located substantially centrally within the cylinder and movable with respect thereto in opposite directions, means providing a port for the passage of liquid from one side of the piston to the other upon piston movement and means providing a body which is variable in volume to compensate for thermal changes and varying pressures in the cylinder, said means being disposed in a central position so as to function substantially equally in compensating for pressure at both ends of the cylinder.

In testimony whereof I have affixed my signature.

CECIL HAMELIN TAYLOR.